April 26, 1927.
H. L. McPHERSON
1,626,294
COMBINATION DUST CAP AND TIRE GAUGE
Original Filed Dec. 22. 1921
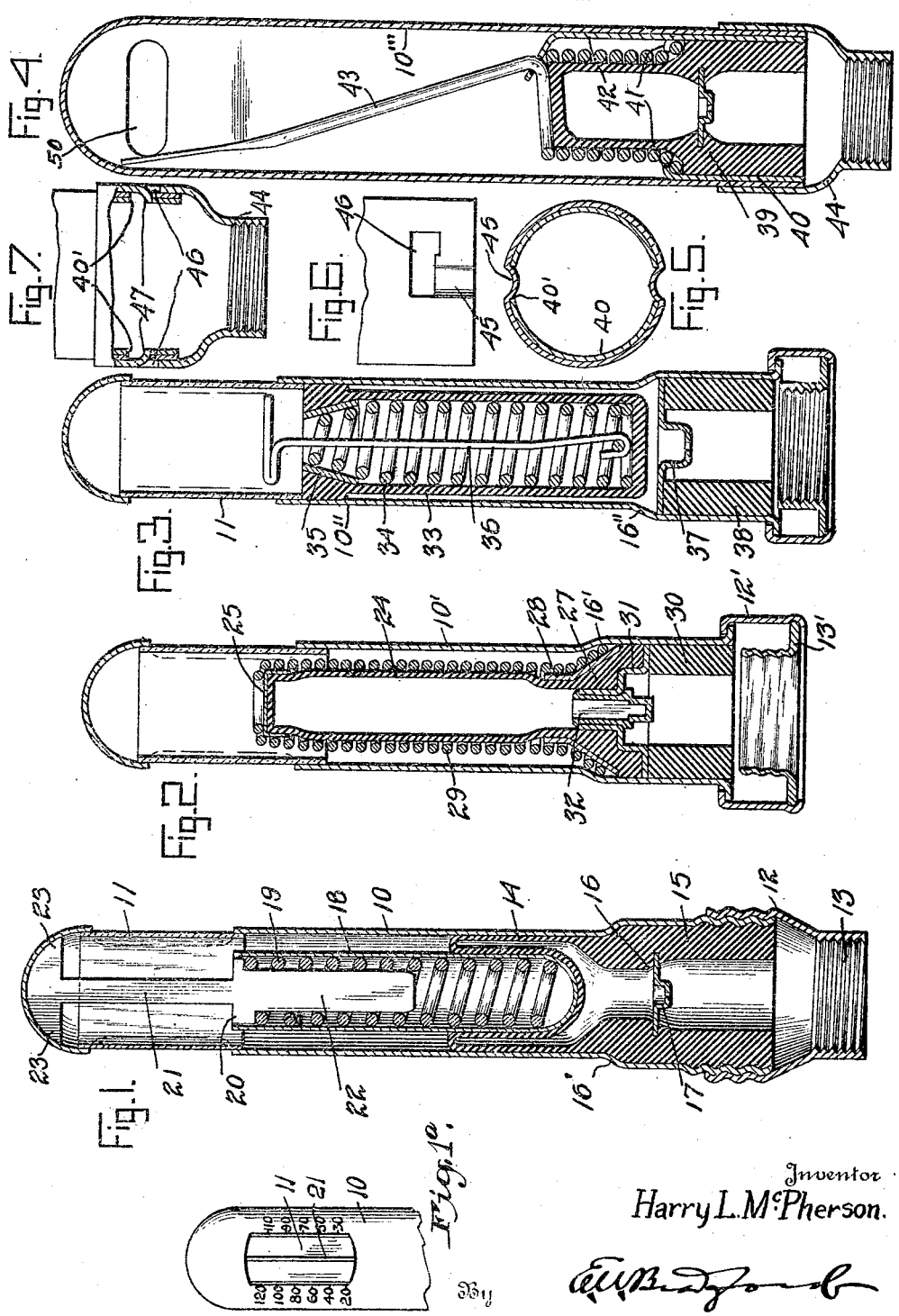
Inventor
Harry L. McPherson.
By
Attorney

UNITED STATES PATENT OFFICE.

HARRY L. McPHERSON, OF MEMPHIS, TENNESSEE, ASSIGNOR, BY DIRECT AND MESNE ASSIGNMENTS, TO A. SCHRADER'S SON, INCORPORATED, OF BROOKLYN, NEW YORK.

COMBINATION DUST CAP AND TIRE GAUGE.

Application filed December 22, 1921, Serial No. 524,227. Renewed May 7, 1926.

My said invention to a tire gauge adapted to be attached to a tire after inflation thereof, to constantly indicate the pressure of air therein. It is an object of my invention to provide a device of the character described which shall be simple and inexpensive to manufacture and reliable in use.

Referring to the accompanying drawings which are made a part hereof and on which similar reference characters indicate similar parts, Figure 1 shows in vertical section one form of my device, Figure 1ª is a side view at right angles to Figure 1 of the upper end of the device illustrating the graduations on the casing, Figure 2 is a vertical section of a modification, Figure 3 is a similar view of another modification, Figure 4 is a vertical section of still another modification, and Figures 5, 6 and 7 are details showing a connection between the parts at the lower end of Figure 4.

In the drawings 10 indicates a cap or casing having the functions of the ordinary dust cap for pneumatic tires, this cap having near its upper end a pair of opposed vertical slots. The slots are closed by a cylinder 11 of celluloid or other transparent material to prevent entrance of dust, dirt, and other deleterious matter into the gauge housing. At the sides of the slots there are formed graduations with numerals to indicate the pressure of air in the tire in pounds as shown in Fig. 1ª. At the lower end of the cap 10 there is connected, a union consisting of a pressed metal nut 12 having interior threads 13 at its lower smaller end to engage the threads on a tire valve casing, and rolled threads on its upper larger end to engage similar rolled threads on the lower end of cap 10. Within the cap is a rubber thimble 14 thickened at its lower end to provide a packing as shown at 15 and closed at its upper end to form a cap which is normally similar in shape to cap 10. The thickened lower portion of the thimble may have an inclined annular shoulder at 16 corresponding generally to the annular shoulder 16′ of the cap. A valve opener or tire valve depressor 17 preferably in the form of a small disk of metal is supported just below the shoulder in position to contact with the stem of the valve and open the same when the device is applied to a valve casing. At the same time the annular surface of the packing at the lower end of the thimble makes a tight fit with the valve casing preferably at the shoulder formed by the nipple and body portion of said casing to prevent loss of air. A cup 18 is located within the cap 10 in a position to depress the upper end of the rubber thimble as shown. This cup contains a spring 19 which bears at its upper end against a shoulder 20 on a stop 21 for the spring 19. This stop is preferably stamped out of sheet metal and comprises a lower depending portion 22 extending into the spring, a shoulder 20, a narrow body portion extending upward therefrom and a pair of outturned lugs 23 adapted to seat against the upper end of the cap.

In the operation of this device, when the same is applied to a tire the pressed metal nut 12 is first screwed down on the body portion of the valve casing. The gauge is then applied to the valve casing nipple, and the nut 12 is backed on to the gauge, the rolled threads on the nut engaging the rolled threads on cap 10. The differential action of the two sets of threads draws the gauge firmly into contact with the casing comprising the lower end of the thimble 14, whereupon the valve is depressed by the member 17, and the air from the tire will enter the rubber thimble 15 and expand the same according to the amount of pressure in the tire thereby raising the cup 18 against the force of the spring 19. The upper end of the cup will register with the mark on the outside of the cap 10 to indicate the pressure of air in the tire.

Figure 2 shows a modified form in which a resilient thimble 24 preferably made of rubber is located similarly to the thimble in Figure 1. The thimble 24 has at its upper end a metallic reinforcement 25 which serves as an indicating means. At its lower end the thimble has a narrow neck and a flaring thickened portion 27. A collar 28 surrounds the neck and is flared at its lower end to embrace said thickened portion. This collar co-acts with a shoulder 16′ on the cap 10′ to clamp the lower end of a spring 29 which surrounds the rubber thimble and at its upper end is coiled partially over the reenforcement 25 to hold down the cap against the pressure of air in the tire. A gasket 30 is located beneath the lower end of the rubber thimble and serves to provide a seal with the end of a valve casing, while a supporting member 31 for a valve opening device is held between the upper end of the gasket and the lower end of the thimble 24. The supporting device comprises a collar which may be stamped out of sheet metal and which has a cylindrical portion in which is held a valve opening device 32. At the lower end the cap 10' is connected a union comprising two members 12' and 13', of which the latter is screw threaded for connection to the valve casing and the former has inturned flanges covering corresponding flanges on the cap and the member 13'.

The modification illustrated in Figure 3 has a rubber thimble 33 supported in inverted position within the casing, said thimble having a thickened wall resting against a shoulder formed by the cap 10 and collar 11. A spring 34 is positioned within the thimble 33 and bears at its upper end against a tapering collar 35 seated against a similar conformation on the thimble and at its other end against the closed end of the thimble. The spring has at its lower end a transversely extending part which engages a hook on an indicating member 36 bent at its upper end to extend straight across the outer casing. In this modification the valve opener 37 is held against the shoulder 16" by a gasket 38. The operation of the device in Figure 3 is substantially similar to that in Figure 1 as will be understood.

Figure 4 shows still another modification in which the rubber thimble 39 is substantially similar to the thimble in Figure 1, the upper end however being flat, and being made thick to prevent distortion. A spring surrounds the thimble, said spring being held down by a metallic cylinder 40 fixed in the casing and having inwardly projecting fingers 41 to engage its lowermost convolution. At its upper end the spring acts to oppose extension of the thimble. The cylinder 40 has an upwardly extending finger 42 bent inwardly at the end and having a perforation. An indicator 43 passes through this perforation, the extension 42 providing a sort of pivotal bearing therefor. In the device here shown the indicator is formed integrally with the spring but may of course be separate therefrom.

As will be evident the indicator in Figure 4 swings at its upper end transversely of the casing and a transverse window 50 is provided in the casing at the side on which there may be graduations and numerals as hereinbefore described. The lower end of the device shown in Figure 4 comprises a threaded collar 44 for engagement with a valve stem, the cap 10''' having connection therewith by a bayonet joint as indicated in Figures 5, 6, and 7. For this purpose the cylinder has oppositely positioned slots 40' and the cap has oppositely located grooves 45 ending in openings 46. The collar 44 has correspondingly located inwardly bent fingers 47 adapted to be engaged with the openings in the usual manner. Obviously, any of the forms of couplings disclosed can be used with the various modifications of gauge shown.

It will be obvious that various modifications may be made in my device by those skilled in the art without departing from the spirit of my invention the true scope of which is shown in the appended claims.

Having thus fully described my said invention, what I claim as new and desire to secure by Letters Patent, is:

1. A tire pressure gauge comprising a casing having a compressible packing therein adjacent the lower end thereof adapted to embrace the nipple of a valve casing and a tire valve depressor carried solely by the packing.

2. A tire pressure gauge comprising a casing having a compressible packing therein adjacent the lower end thereof adapted to embrace the nipple of a valve casing and a disk-shaped perforated tire valve depressor carried solely by the packing.

3. A tire pressure gauge comprising a casing, an elastic thimble in said casing, the open end of the thimble being thickened and adapted to engage and embrace the nipple of a valve casing, and a tire valve depressor carried solely by the thimble.

4. A tire pressure gauge comprising a casing, coupling means at the foot of the casing, adapted to engage the body portion of a tire valve, a packing adapted to engage the nipple portion of a tire valve and form a tight seal with the shoulder provided by the nipple and body portions of said tire valve when the gauge is connected therewith and a tire valve depressor carried solely by the packing.

5. A tire pressure gauge comprising a casing open at one end, and having a sight opening, an elastic thimble, the open end of which is secured within the open end of the casing, a coil spring encircling said thimble and opposing its elongation when subjected to air pressure from within a tire, one end of said spring being anchored, and the other end adapted to move past the sight opening in the casing when the thimble is distended, and serve as an indicator element.

6. A tire pressure gauge comprising a casing open at one end and having a sight opening, an elastic thimble, the open end of which is secured within the open end of the casing, a coil spring encircling said thimble and opposing its elongation when subjected to air pressure from within a tire, one end of said spring being anchored, and the other end being formed as a needle adapted to move past the sight opening in the casing when the thimble is distended and serve as an indicator element.

7. A tire pressure gauge comprising a casing open at one end and having a sight opening near its closed end, an elastic thimble, the open end of which is secured within the open end of the casing, and the closed end of which is reinforced, a coil spring encircling said thimble and opposing its elongation when subjected to air pressure from within a tire, one end of said spring being anchored, another portion thereof seating against the top of the thimble, and the other end being formed as a needle adapted to move past the sight opening in the casing when the thimble is distended.

In witness whereof, I have hereunto set my hand at Memphis, Tennessee, this 16th day of December, A. D. nineteen hundred and twenty-one.

HARRY L. McPHERSON.